No. 668,517. Patented Feb. 19, 1901.
J. HEWITT.
STORAGE BATTERY PLATE.
(Application filed June 12, 1900.)
(No Model.)
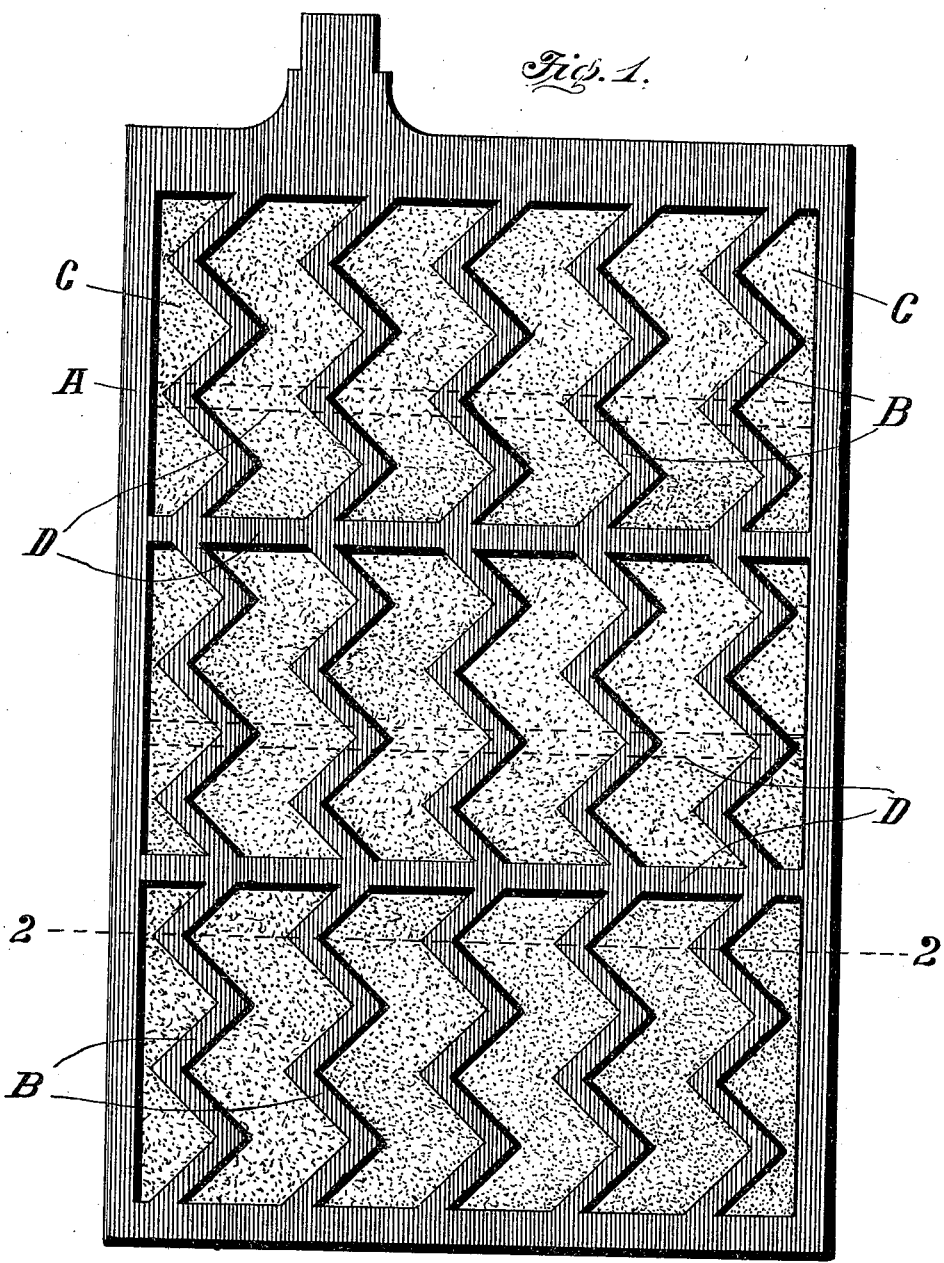
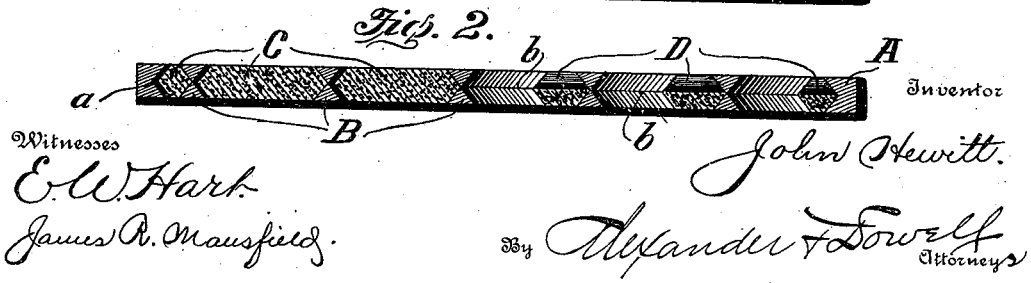

UNITED STATES PATENT OFFICE.

JOHN HEWITT, OF CHICAGO, ILLINOIS, ASSIGNOR TO THE HEWITT LINDSTROM MOTOR COMPANY, OF SAME PLACE.

STORAGE-BATTERY PLATE.

SPECIFICATION forming part of Letters Patent No. 668,517, dated February 19, 1901.

Application filed June 12, 1900. Serial No. 20,033. (No model.)

*To all whom it may concern:*

Be it known that I, JOHN HEWITT, of Chicago, in the county of Cook and State of Illinois, have invented certain new and useful Improvements in Storage-Battery Plates; and I hereby declare that the following is a full, clear, and exact description thereof, reference being had to the accompanying drawings, which form part of this specification.

This invention is an improvement in storage batteries, having particular reference to the structure of the battery-plate; and its object is to provide a plate wherein the layers of active material may be practically continuous from the top to the bottom of the plate, while supported almost continuously from the top to the bottom of the plate by zigzag or tortuous stays extending from the top to the bottom of the plate.

The invention therefore consists in the novel construction of the plate, as hereinafter described and claimed, reference being had to the accompanying drawings, in which—

Figure 1 is a side view of a simple form of plate embodying my invention. Fig. 2 is a transverse section on line 2 2, Fig. 1, looking upward.

As shown, the plate is rectangular, but may be of any other desired form, and consists of a frame A, the inner edges of the side members of the frame being preferably concaved or grooved, as indicated at *a*, Fig. 2. Connecting the top and bottom bars of the frame are a series of tortuous serpentine or zigzag stays B, each of which in the form shown has a succession of right-angled bends transverse to the plane of the plate when viewed from the face thereof, said stays appearing flat when viewed from the edge of the plate. These stays are grooved on each inner side, as shown at *b b*, so that they will securely retain the active material C, which is placed in the spaces between the stays, and may extend continuously from the top to the bottom of the plate, as shown. By reason of the serpentine or zigzag form of the stays there will be little if any liability to buckling of the plates; but to prevent the stays buckling and to stiffen the plate the stays are connected at various points by transverse bars D. These bars are arranged alternately on opposite faces of the plate and may be only half as thick as the stays, so as not to interfere with the electrical continuity of the active material placed in the spaces between the stays. A further advantage of this construction is that while the active material extends continuously from the top to the bottom of the plate it is supported or suspended throughout by reason of the underlying or underprojecting bends or deflections of the stays, which give a firm support to the active material from the top to the bottom of the plate and hold the material securely in place.

Preferably the stays are all formed alike, so that the deflections or bends therein will correspond and thus present a more symmetrical appearance.

Having thus described my invention, what I therefore claim as new, and desire to secure by Letters Patent thereon, is—

A plate for storage batteries consisting of a frame and a series of zigzag stays extending from the top to the bottom thereof, said stays being grooved on their inner edges, and transverse bars formed integral with the plate and extending across the frame transversely of and uniting the stays, alternate bars being arranged on opposite faces of the plate and being of less thickness than the stays, for the purpose and substantially as described.

In testimony that I claim the foregoing as my own I affix my signature in presence of two witnesses.

JOHN HEWITT.

Witnesses:
W. H. WARVEL,
JOHN C. GERSTETTER.